United States Patent
Nakano et al.

(10) Patent No.: US 8,420,560 B2
(45) Date of Patent: Apr. 16, 2013

(54) DIELECTRIC CERAMIC, METHOD FOR PRODUCING DIELECTRIC CERAMIC, AND METHOD FOR PRODUCING POWDER FOR PRODUCING DIELECTRIC CERAMIC

(75) Inventors: Takahiro Nakano, Tokyo (JP); Yasuharu Miyauchi, Tokyo (JP); Tomoko Nakamura, Tokyo (JP)

(73) Assignee: TDK Corporation, Tokyo (JP)

( * ) Notice: Subject to any disclaimer, the term of this patent is extended or adjusted under 35 U.S.C. 154(b) by 62 days.

(21) Appl. No.: 13/051,537

(22) Filed: Mar. 18, 2011

(65) Prior Publication Data

US 2011/0245066 A1 Oct. 6, 2011

(30) Foreign Application Priority Data

Mar. 31, 2010 (JP) .................................. 2010-080848

(51) Int. Cl.
*C04B 35/468* (2006.01)

(52) U.S. Cl.
USPC .......................................... 501/138; 501/139

(58) Field of Classification Search .................. 501/138, 501/139
See application file for complete search history.

(56) References Cited

U.S. PATENT DOCUMENTS

| | | | |
|---|---|---|---|
| 5,272,122 A | 12/1993 | Mizuno et al. | |
| 6,340,649 B1 | 1/2002 | Kawata et al. | |
| 6,458,734 B1 | 10/2002 | Sugimoto et al. | |
| 6,740,614 B2 | 5/2004 | Kim et al. | |
| 7,687,015 B2 | 3/2010 | Watanabe et al. | |
| 2003/0100429 A1 | 5/2003 | Kim et al. | |
| 2006/0075782 A1 | 4/2006 | Watanabe et al. | |
| 2007/0213202 A1 | 9/2007 | Arashi et al. | |
| 2010/0243296 A1* | 9/2010 | Miyauchi et al. | 174/251 |
| 2011/0245066 A1 | 10/2011 | Nakano et al. | |

FOREIGN PATENT DOCUMENTS

| | | |
|---|---|---|
| CN | 1418845 A | 5/2003 |
| EP | 1 860 080 A1 | 11/2007 |
| JP | A-5-70222 | 3/1993 |
| JP | A-05-325641 | 12/1993 |
| JP | A-2006-273616 | 10/2006 |
| JP | A-2006-273617 | 10/2006 |
| JP | A-2010-228928 | 10/2010 |

OTHER PUBLICATIONS

May 3, 2012 Office Action issued in Chinese Patent Application No. 201010141177.5.
Jun. 22, 2012 Extended Search Report issued in European Patent Application No. 10157666.8.
U.S. Appl. No. 12/729,427, filed Mar. 23, 2010.

* cited by examiner

*Primary Examiner* — Karl Group
(74) *Attorney, Agent, or Firm* — Oliff & Berridge, PLC

(57) ABSTRACT

A dielectric ceramic includes a main component and a minor component. The main component includes a $BaTi_4O_9$ crystal phase and a $Ba_2Ti_9O_{20}$ crystal phase, is represented by $BaO·xTiO_2$, has a molar ratio x of $TiO_2$ to $BaO$ of 4.6 to 8.0, and in X-ray diffraction, and has an X-ray diffraction peak intensity ratio $I_{29}/I_{14}$ of a maximum diffraction peak intensity ($I_{14}$) of the $BaTi_4O_9$ crystal phase to a maximum diffraction peak intensity ($I_{29}$) of the $Ba_2Ti_9O_{20}$ crystal phase of 1 or more. The minor component includes a boron oxide and a copper oxide, in which the boron oxide content is in the range of 0.5 to 5.0 parts by mass with respect to 100 parts by mass of the main component, and the copper oxide content is in the range of 0.1 to 3.0 parts by mass with respect to 100 parts by mass of the main component.

1 Claim, 3 Drawing Sheets

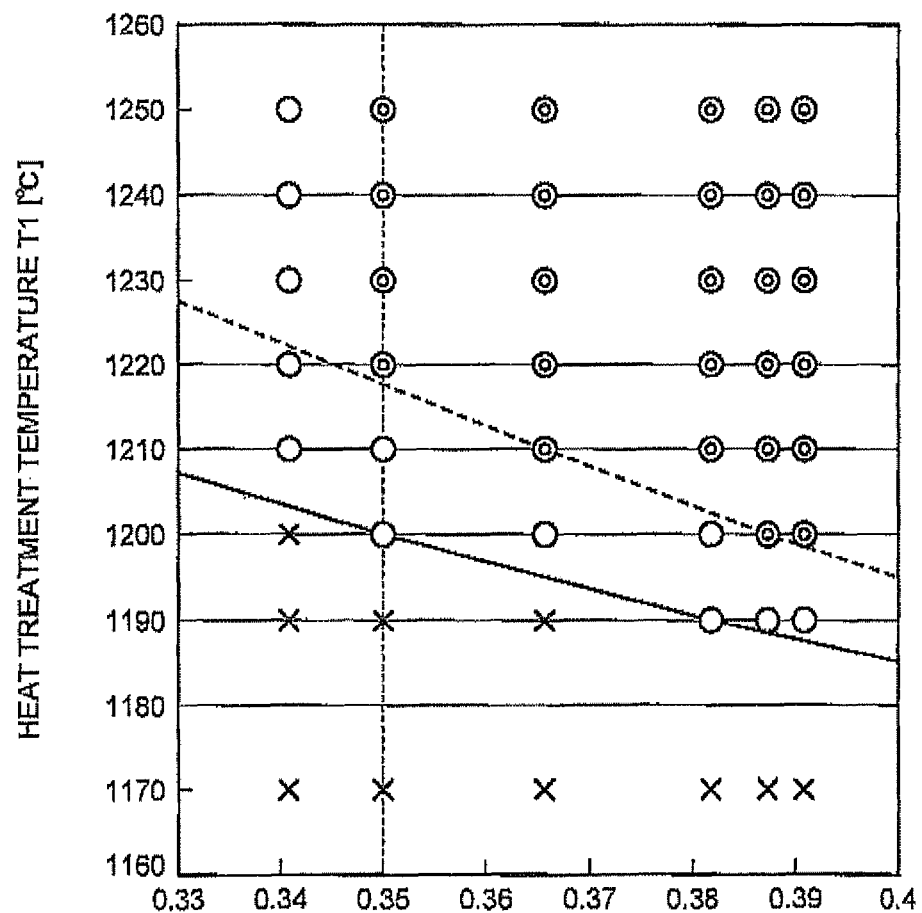

DIELECTRIC CERAMIC, METHOD FOR PRODUCING DIELECTRIC CERAMIC, AND METHOD FOR PRODUCING POWDER FOR PRODUCING DIELECTRIC CERAMIC

CROSS-REFERENCE TO RELATED APPLICATIONS

This application is based upon and claims the benefit of priority from Japanese Patent Application No. 2010-080848, filed on Mar. 31, 2010, the entire contents of which are incorporated herein by reference.

BACKGROUND OF THE INVENTION

1. Field of the Invention

The present invention relates to a dielectric ceramic having a low-temperature sintering property that can use a low-melting-point conductor material, which has Ag or the like as a main component, for an internal electrode, a method for producing the dielectric ceramic, and a method for producing a powder for producing the dielectric ceramic.

2. Description of the Related Art

Recently, a high-frequency band referred to as so-called "quasi-microwaves" of about several hundred MHz to several GHz is used for mobile phones and other such mobile communication devices whose demand is increasing. Consequently, there is need for devices having good high-frequency properties (hereinafter, "high-frequency devices") as an electronic device, such as a filter, a resonator, a capacitor and the like, which is used in mobile communication devices. Further, with the decreasing size of recent mobile communication devices, there is also a need to reduce the size of high-frequency devices.

Concerning such high-frequency devices, depending on the intended purpose, a dielectric material having a relative permittivity from 30 to 60 in the used frequency and a low dielectric loss is desired. As such a dielectric material, among materials having a $BaO-TiO_2$ compound as a main component, a dielectric material that includes a $BaTi_4O_9$ and a $Ba_2Ti_9O_{20}$ crystal phase has been proposed.

For example, Japanese Laid-open Patent Publication No. 5-70222 discloses a $BaO$-$xTiO_2$ dielectric ceramic that suppresses the occurrence of cracks, which includes a $BaTi_4O_5$ and a $Ba_2Ti_9O_{20}$ crystal phase, and which has a content ratio of $Ba_2Ti_9O_{20}$ with respect to the sum of $BaTi_4O_9$ and $Ba_2Ti_9O_{20}$ of less than 0.19.

When forming a high-frequency device, since the dielectric material and the conductor material that will serve as the internal electrodes and wiring in the high-frequency device are co-fired, the conductor material needs to have a higher melting point than the sintering temperature of the dielectric material so that it does not melt during the co-firing with the dielectric material. For a $BaO-TiO2$ dielectric material, the sintering temperature is 1,000° C. or higher, which is remarkably high. Therefore, conventionally, Pd or Pt, which have a high melting point but are expensive, had to be used for the conductor material. On the other hand, Ag or an alloy having Ag as a main component (hereinafter, "Ag-based metal") are inexpensive, have a low electrical resistance, and can reduce loss due to conduction in the high-frequency region. However, when an Ag-based metal is used as a conductor material, the Ag-based metal has a melting point of about 900° C. less than 1000° C., which is lower than the sintering temperature of the dielectric material. Consequently, when trying to obtain a multifunctional substrate that includes a conductor material and a dielectric material by co-firing, in which a low-melting-point conductor material such as an Ag-based metal is used as an internal electrode, it is necessary to reduce the sintering temperature to about 900° C., for example.

However, when co-firing a multifunctional substrate that uses a low-melting-point conductor material such as an Ag-based metal as an internal electrode, for a $BaO-TiO_2$ dielectric material including a $BaTi_4O_9$ and a $Ba_2Ti_9O_{20}$ crystal phase in a main component, there is the problem that if a larger amount of the $BaTi_4O_9$ crystal phase and a smaller amount of the $Ba_2Ti_9O_{20}$ crystal phase is included, the sintering cannot be sufficiently carried out even if a minor component is added for low-temperature firing of the dielectric material. Therefore, the dielectric properties of the dielectric material, such as relative permittivity $\epsilon r$ and Qf, deteriorate, and the mechanical strength of the dielectric material decreases. Qf is expressed as the product of a quality factor $Q=1/\tan \delta$ and a resonance frequency f. If the dielectric loss decreases, the Qf factor increases. The term "dielectric loss" means the power loss of high-frequency electronic parts. There is a demand for low-loss dielectric materials that have a large Qf factor.

Further, there is also the problem that, in order to perform sufficient sintering, if the sintering temperature when co-firing a multifunctional substrate that includes a low-melting-point conductor material and a dielectric material is increased to, for example, 960° C. or more, the Ag in the conductor material melts.

SUMMARY OF THE INVENTION

A dielectric ceramic according to an aspect of the present invention includes a main component that contains a $BaTi_4O_9$ crystal phase and a $Ba_2Ti_9O_{20}$ crystal phase and is represented by a composition formula $(BaO.xTiO_2)$, the main component having a molar ratio x of $TiO_2$ with respect to BaO, the molar ratio x being in the range of 4.6 to 8.0, and in X-ray diffraction, the main component having an X-ray diffraction peak intensity ratio $I_{29}/I_{14}$ of a maximum diffraction peak intensity $(I_{14})$ of the $BaTi_4O_9$ crystal phase to a maximum diffraction peak intensity $(I_{29})$ of the $Ba_2Ti_9O_{20}$ crystal phase, the X-ray diffraction peak intensity ratio $I_{29}/I_{14}$ being 1 or more; and a minor component that contains a boron oxide and a copper oxide, in which a content of the boron oxide in terms of $B_2O_3$ is in the range of 0.5 to 5.0 parts by mass with respect to 100 parts by mass of the main component, and a content of the copper oxide in terms of CuO is in the range of 0.1 to 3.0 parts by mass based on 100 parts by mass of the main component.

A method according to another aspect of the present invention is for producing a dielectric ceramic, the dielectric ceramic including a main component and a minor component, the main component containing a $BaTi_4O_9$ crystal phase and a $Ba_2Ti_9O_{20}$ crystal phase and being represented by a composition formula $(BaO.xTiO_2)$, the main component having a molar ratio x of $TiO_2$ with respect to BaO, the molar ratio x being in the range of 4.6 to 8.0, and the minor component containing a boron oxide and a copper oxide, in which a content of the boron oxide in terms of $B_2O_3$ is in the range of 0.5 to 5.0 parts by mass with respect to 100 parts by mass of the main component, and a content of the copper oxide in terms of CuO is in the range of 0.1 to 3.0 parts by mass with respect to 100 parts by mass of the main component. The method includes producing a main component powder including a $BaTi_4O_9$ crystal phase and a $Ba_2Ti_9O_{20}$ crystal phase by mixing raw material powder including barium with raw material powder including titanium; producing a dielectric ceramic composition by mixing the main component powder and the minor component including the boron oxide and the copper oxide; producing a molded body by using the dielectric ceramic composition; producing a laminated body by laminating a plurality of the molded bodies; and obtaining a sintered body by firing the laminated body. An X-ray diffraction peak intensity ratio $I_{23}/I_{14}$ of a maximum diffraction peak intensity ($I_{14}$) of the $BaTi_4O_9$ crystal phase to a maximum diffraction peak intensity ($I_{29}$) of the $Ba_2Ti_9O_{20}$ crystal phase obtained by X-ray diffraction of the main component powder is 1 or more.

A method according to still another aspect of the present invention is for producing a dielectric ceramic, the dielectric ceramic including a main component and a minor component, the main component containing a $Ba_2Ti_9O_{20}$ crystal phase and being represented by a composition formula ($BaO \cdot xTiO_2$), the main component having a molar ratio x of $TiO_2$ with respect to BaO, the molar ratio x being in the range of 4.6 to 8.0, the minor component containing a boron oxide and a copper oxide, in which a content of the boron oxide in terms of $B_2O_3$ is in the range of 0.5 to 5.0 parts by mass with respect to 100 parts by mass of the main component, and a content of the copper oxide in terms of CuO is in the range of 0.1 to 3.0 parts by mass with respect to 100 parts by mass of the main component. The method includes producing a main component powder including a $BaTi_4O_9$ crystal phase and a $Ba_2Ti_9O_{20}$ crystal phase by mixing raw material powder including barium with raw material powder including titanium, and heat treating a resultant powder mixture at a heat treatment temperature Ti in a temperature range which satisfies the following Inequality (1); producing a dielectric ceramic composition by mixing the main component powder and the minor component including the boron oxide and the copper oxide; producing a molded body by using the dielectric ceramic composition; producing a laminated body by laminating a plurality of the formed bodies; and obtaining a sintered body by firing the laminated body. When a particle size distribution of the resultant powder mixture is measured, if a cumulative 10% particle size is $D_{10}$, a cumulative 50% particle size is $D_{50}$, and a cumulative 90% particle size is $D_{90}$, an index value α of the particle size distribution of the resultant powder mixture satisfies the following Equation (2).

$$T1 \geq 1080 + 42/\alpha \quad (1)$$

$$\alpha = (D_{50} - D_{10})/(D_{90} - D_{10}) \quad (2).$$

A method according to still another aspect of the present invention is for producing a powder for producing a dielectric ceramic, the dielectric ceramic powder including a $BaTi_4O_9$ crystal phase and a $Ba_2Ti_9O_{20}$ crystal phase, the dielectric ceramic powder being represented by a composition formula ($BaO \cdot xTiO_2$), the dielectric ceramic powder having a molar ratio x of $TiO_2$ with respect to BaO, the molar ratio x being in the range of 4.6 to 8.0. The method includes preparing a raw material powder mixture by mixing a raw material powder including barium with a raw material powder including titanium; and heat treating the raw material powder mixture to obtain the powder for producing a dielectric ceramic. An X-ray diffraction peak intensity ratio $I_{29}/I_{14}$ of a maximum diffraction peak intensity ($I_{14}$) of the $BaTi_4O_9$ crystal phase to a maximum diffraction peak intensity ($I_{29}$) of the $Ba_2Ti_9O_{20}$ crystal phase obtained by X-ray diffraction of the heat treated dielectric ceramic powder is 1 or more.

A method according to still another aspect of the present invention is for producing a powder for producing a dielectric ceramic, the powder including a Ba2Ti9O20 crystal phase, the powder being represented by a composition formula ($BaO \cdot xTiO_2$), the powder having a molar ratio x of $TiO_2$ with respect to BaO, the molar ratio x being in the range of 4.6 to 8.0. The method includes preparing a raw material powder mixture by mixing raw material powder including barium with raw material powder including titanium; and heat treating the raw material powder mixture to obtain the dielectric ceramic powder by heat treating the raw material powder mixture at a heat treatment temperature T1 in a temperature range which satisfies the above Inequality (1). When a particle size distribution of the raw material powder mixture is measured, if a cumulative 10% particle size is $D_{10}$, a cumulative 50% particle size is $D_{50}$, and a cumulative 90% particle size is $D_{90}$, an index value α of the particle size distribution of the raw material powder mixture satisfies the above Equation (2).

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 illustrates a relationship between an index value α and a heat treatment temperature T1.

DETAILED DESCRIPTION OF THE PREFERRED EMBODIMENTS

Figure 1:
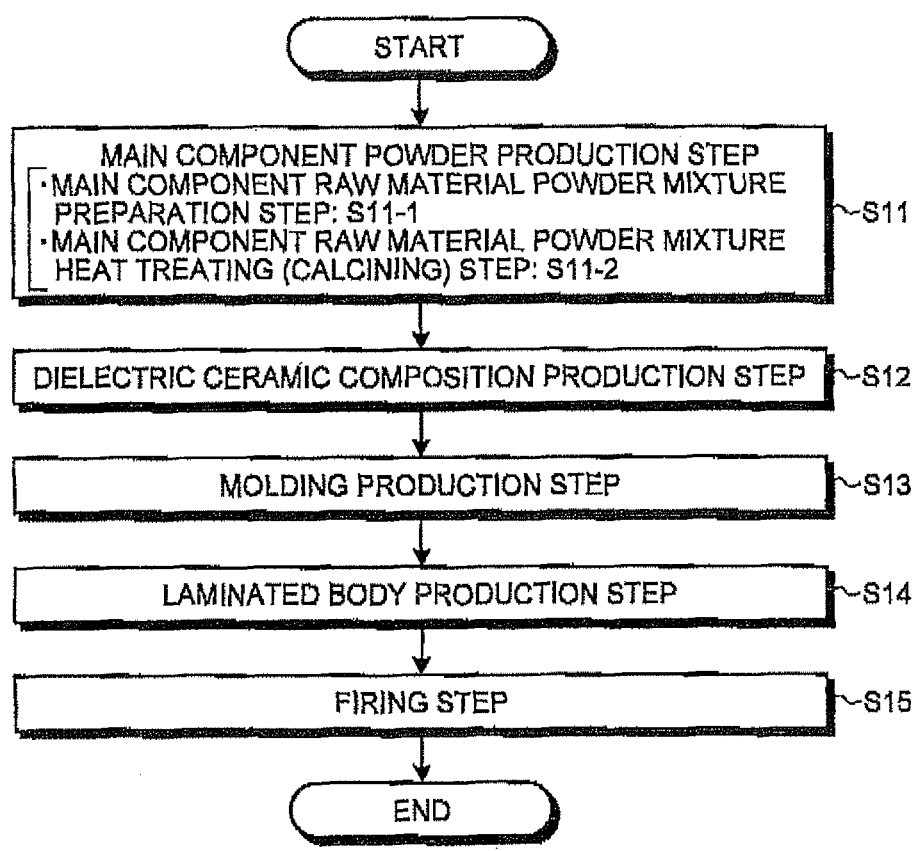
FIG. 1 is a flowchart illustrating a method for producing the dielectric ceramic according to the present embodiment.

An embodiment of the present invention will now be described. However, the present invention is not limited to the following embodiment.

Dielectric Ceramic

The dielectric ceramic according to the present embodiment includes a main component, which includes a $BaTi_4O_9$ crystal phase and a $Ba_2Ti_9O_{20}$ crystal phase, is represented by a composition formula ($BaO \cdot xTiO_2$), has a molar ratio x of $TiO_2$ with respect to BaO of 4.6 or more to 8.0 or less, and in X-ray diffraction, has an X-ray diffraction peak intensity ratio $I_{29}/I_{14}$ of the maximum diffraction peak intensity ($I_{14}$) of the $BaTi_4O_9$ crystal phase to the maximum diffraction peak intensity ($I_{29}$) of the $Ba_2Ti_9O_{20}$ crystal phase of 1 or more. In addition, the dielectric ceramic according to the present embodiment includes a minor component, which includes a boron oxide and a copper oxide, in which the boron oxide content is, in terms of $B_2O_3$, 0.5 parts by mass or more to 5.0 parts by mass or less with respect to 100 parts by mass of the main component, and the copper oxide content is, in terms of CuO, 0.1 parts by mass or more to 3.0 parts by mass or less with respect to 100 parts by mass of the main component.

In the present specification, the term "dielectric ceramic composition" refers to a raw material composition of a dielectric ceramic. The dielectric ceramic, which is a sintered body, can be obtained by sintering the raw material composition. Further, "sintering" refers to the phenomenon in which the dielectric ceramic composition turns into a dense body called a "sintered body". Generally, compared with the pre-heating dielectric ceramic composition, the density and mechanical strength of the sintered body increase. Further, "sintering temperature" refers to the temperature of the dielectric ceramic composition when the dielectric ceramic composition is sintered. In addition, "firing" means a heat treatment carried out for the purpose of sintering, and "firing temperature" refers to the temperature of the environment that the dielectric ceramic composition is exposed to during the heat treatment.

Further, evaluation concerning whether the pre-sintering dielectric ceramic composition of the dielectric ceramic according to the present embodiment can be fired at a low temperature (low-temperature sinterability) can be determined on the basis of firing of several dielectric ceramic compositions while changing (lowering) the firing temperatures, respectively, and seeing whether the dielectric ceramic composition is sufficiently sintered so that the dielectric ceramic can obtain a desired high-frequency dielectric property. In addition, the dielectric properties of the dielectric ceramic according to the present embodiment can be evaluated on the basis of a Qf factor, change in the resonance frequency due to temperature change (resonance frequency temperature coefficient $\tau f$), and a relative permittivity $\epsilon r$. The Qf factor and relative permittivity $\epsilon r$ can be measured in accordance with Japanese Industrial Standards "Method for Testing Dielectric Properties of Fine Ceramics for Microwaves" (JIS R1627, 1996).

Main Component

The main component included in the dielectric ceramic according to the present embodiment is a BaO—TiO$_2$ compound which includes a BaTi$_4$O$_9$ crystal phase and a Ba$_2$Ti$_9$O$_{20}$ crystal phase. By including these crystal phases, the compound is a low-loss material having a relative permittivity $\epsilon r$ of 30 or more to 60 or less and a high Qf factor.

When this BaO—TiO$_2$ compound is represented as BaO.xTiO$_2$, a molar ratio x of TiO$_2$ with respect to BaO in BaO.xTiO$_2$ is set so that it is 4.6 or more to 8.0 or less.

By setting the molar ratio x in this range, the coefficient of linear expansion and the relative permittivity $\epsilon r$ of the produced dielectric ceramic can be adjusted, and deterioration in the electrical properties due to adjustment of the Qf factor can be suppressed. Typically, an electronic part, such as a filter, that is obtained using a dielectric ceramic is mounted on a resin substrate by soldering. If the molar ratio x is less than 4.6, specifically, if the TiO$_2$ content with respect to BaO is too low, since the coefficient of linear expansion is too much below the intended value, the difference with the coefficient of linear expansion of the target resin substrate increases. On the other hand, if the molar ratio x is more than 8, specifically, if the TiO$_2$ content with respect to BaO is too high, although the coefficient of linear expansion slightly increases, the relative permittivity $\epsilon r$ is higher than the intended value, the Qf factor tends to decrease, and electrical properties deteriorate. Therefore, the main component included in the dielectric ceramic according to the present embodiment has a molar ratio x of TiO$_2$ with respect to BaO in the range of 4.6 or more to 8.0 or less.

The dielectric ceramic according to the present embodiment has, in X-ray diffraction, an X-ray diffraction peak intensity ratio $I_{29}/I_{14}$ of the maximum diffraction peak intensity ($I_{14}$) of the BaTi$_4$O$_9$ crystal phase to the maximum diffraction peak intensity ($I_{29}$) of the Ba$_2$Ti$_9$O$_{20}$ crystal phase included in the main component of 1 or more. Further, the X-ray diffraction peak intensity ratio $I_{29}/I_{14}$ is more preferably 5 or more, and more preferably 7 or more.

By setting the X-ray diffraction peak intensity ratio $I_{29}/I_{14}$ to 1 or more, the ratio of the Ba$_2$Ti$_9$O$_{20}$ crystal phase is greater than the ratio of the BaTi$_4$O$_9$ crystal phase included in the main component. Consequently, a dielectric ceramic composition including this main component can be co-fired with an Ag-based metal at a temperature low enough that the Ag-based metal does not melt. Further, this also allows the dielectric ceramic according to the present embodiment obtained by sintering the dielectric ceramic composition to maintain its dielectric properties such as relative permittivity $\epsilon r$ and Qf.

Minor Component

The minor component included in the dielectric ceramic according to the present embodiment includes a boron oxide and a copper oxide. The minor component is used as a sintering aid for forming a liquid phase during the firing of the dielectric ceramic composition that is obtained as described below. Examples of the boron oxide include B$_2$O$_3$. Examples of the copper oxide include CuO. Adding the boron oxide and the copper oxide being the minor components as a sintering aid for forming a liquid phase during firing enables the main component powder, which includes a BaO—TiO$_2$ compound, to be co-fired with a low-melting-point conductor material, such as an Ag-based metal. Consequently, low-temperature firing can be achieved. Further, by including a copper oxide as the minor component, if the molar ratio x in BaO.xTiO$_2$, which is the main component, is in the above-described range, low-temperature sintering can be achieved, and the Qf factor can be maintained.

The boron oxide content is, in terms of B$_2$O$_3$, 0.5 parts by mass or more to 5.0 parts by mass or less with respect to 100 parts by mass of the main component. The copper oxide content is, in terms of CuO, 0.1 parts by mass or more to 3.0 parts by mass or less with respect to 100 parts by mass of the main component. A deterioration on the Qf factor means that there is a greater electronic part loss. Thus, the larger the Qf factor, the more the electronic part loss is suppressed. Setting the contents of the boron oxide and copper oxide in the above-described ranges enables low-temperature sintering of the dielectric ceramic composition to be achieved while maintaining the Qf factor of the dielectric ceramic according to the present embodiment to be equal to or more than a predetermined value (for example, 10,000 GHz). Consequently, the dielectric ceramic according to the present embodiment can be sintered at the low temperatures used for electronic parts having a low-melting-point conductor material such as an Ag-based metal as an internal electrode.

Although a smaller boron oxide content is more effective in order to exploit the properties (Qf factor) of the main component, if the boron oxide content is less than 0.5 parts by Mass with respect to 100 parts by mass of the main component, it becomes difficult to perform low-temperature firing at a temperature that allows co-firing with the conductor material, such as an Ag-based metal, and the Qf factor also decreases. For this reason, the boron oxide content is set at 0.5 parts by mass or more. Further, although a larger boron oxide content facilitates low-temperature firing, if the boron oxide content is more than 5.0 parts by mass with respect to 100 parts by mass of the main component, the properties (Qf factor) of the main component deteriorate, low-temperature firing also becomes more difficult, and the post-sintering density deteriorates. For this reason, the boron oxide content is set at 5.0 parts by mass or less. It is preferred to include a boron oxide at a content of about 2.5 parts by mass.

Although a smaller copper oxide content is more effective in order to exploit the properties (Qf factor) of the main component, if the copper oxide content is less than 0.1 parts by mass, it becomes difficult to perform low-temperature firing at a temperature that allows co-firing with a low-melting-point conductor material, such as an Ag-based metal, and the Qf factor also decreases. For this reason, the copper oxide content is set at 0.1 parts by mass or more. Further, although a larger copper oxide Content facilitates low-temperature firing, if the copper oxide content is more than 3.0 parts by mass, the properties (Qf factor) of the main component deteriorate, low-temperature firing also becomes more difficult, and the post-sintering density deteriorates. For this reason, the copper oxide content is set at 3.0 parts by mass or less. It is preferred to include a copper oxide at a content of about 1 part by mass.

In addition to the boron oxide and copper oxide, the dielectric ceramic according to the present embodiment may also include a zinc oxide as the minor component. Examples of the zinc oxide include ZnO. Adding a small amount of a zinc oxide as the minor component in addition to the boron oxide and copper oxide enables even lower low-temperature firing to be achieved. It is preferred that the zinc oxide content is, in terms of ZnO, 0.1 parts by mass or more to 5.0 parts by mass or less with respect to 100 parts by mass of the main component.

Although the dielectric ceramic according to the present embodiment may include a zinc oxide, it is free from a glass component.

According to the dielectric ceramic according to the present embodiment, by setting the X-ray diffraction peak intensity ratio $I_{29}/I_{14}$ to 1 or more, not only can a dielectric ceramic composition be co-fired with a low-melting-point conductor material, such as an Ag-based metal, at a temperature low enough that the Ag-based metal does not melt, but also dielectric properties and mechanical strength can be maintained.

Method for Producing Dielectric Ceramic

The method for producing the dielectric ceramic according to the present embodiment will now be described. FIG. 1 is a flowchart illustrating the method for producing the dielectric ceramic according to the present embodiment. As illustrated in FIG. 1, the method for producing the dielectric ceramic according to the present embodiment produces a dielectric ceramic including a BaO—TiO$_2$ compound, which includes a BaTi$_4$O$_9$ crystal phase and a Ba$_2$TiO$_{20}$ crystal phase, as a main component, and a boron oxide and a copper oxide as minor components. This method includes the following steps of:

(a) producing a main component powder by mixing a raw material powder including barium with a raw material powder including titanium as the main component (Step S11);
(b) producing a dielectric ceramic composition from the main component powder and minor components (Step S12);
(c) producing a molded body by coating a paste which includes a powder of the dielectric ceramic composition on a substrate (Step S13);
(d) producing a laminated body by laminating a plurality of green sheets (Step S14); and
(e) obtaining a sintered body by firing the laminated body (Step S15).

Main Component Powder Production Step: Step S11

In the main component powder production step (Step S11), a main component powder is produced by mixing a raw material powder including barium with a raw material powder including titanium as the main component. The main component powder production step (Step S11) includes a step of preparing a main component raw material powder mixture (Step S11-1) and a step of heat treating (calcining) the main component raw material powder mixture (Step S11-2). The main component powder obtained by the main component powder production step (Step S11) is used as a powder for producing the dielectric ceramic.

Main Component Raw Material Powder Mixture Preparation Step: Step S11-1

In the step of preparing a main component raw material powder mixture (Step S11-1), a main component raw material powder mixture is prepared by mixing a raw material powder including barium with a raw material powder including titanium as the main component. The raw materials for the main component of the dielectric ceramic are, for example, a barium carbonate (BaCO$_3$), titanium oxide (TiO$_2$), or BaO.TiO$_2$ compound, or a compound that turns into these oxides by firing (heat treatment such as the below-described calcination). Examples of compounds which can turn into these oxides when fired by a heat treatment such as the below-described calcination include carbonates, nitrates, oxalates, hydroxides, sulfides, and organometallic compounds.

Predetermined amounts of both the raw material powder including barium and the raw material powder including titanium, which serve as the main component raw materials, are weighed and mixed. Before this mixing, each of the raw materials is weighed so that the molar ratio x of TiO$_2$ with respect to BaO in the composition formula BaO.xTiO$_2$ of the dielectric ceramic main component is in the above-described range. Specifically, the mixing is carried out so that, when the BaO—TiO$_2$ compound is represented as BaO.xTiO$_2$, the molar ratio x of TiO$_2$ with respect to BaO is 4.6 or more to 8.0 or less. As described above, by setting the molar ratio x of TiO$_2$ with respect to BaO in the above range, the coefficient of linear expansion and the relative permittivity εr and the Qf factor of the produced dielectric ceramic can be adjusted, and deterioration in the electrical properties can be suppressed. The mixing of the BaCO$_3$ powder and the TiO$_2$ powder can be carried out by a mixing method such as dry mixing or wet mixing. For example, the mixing can be carried out using a solvent such as pure water or ethanol with a mixing/dispersion machine, such as a ball mill. The mixing time when using a ball mill may be about 4 to 24 hours.

It is preferred to dry the main component raw material powder mixture of the raw material power including barium and the raw material powder including titanium at 100° C. or more to 200° C. or less, and more preferably 120° C. or more to 140° C. or lees, for about 12 to 36 hours. After the main component raw material powder is prepared, the process proceeds to the step of calcining the main component raw material powder mixture (Step S11-2).

Main Component Raw Material Powder Mixture Calcining (Heat Treating) Step: Step S11-2

In the step of calcining (heat treating) the main component raw material powder mixture (Step S11-2), the main component powder is obtained by calcining (heat treating) the main component raw material powder mixture. The main component raw material powder is calcined (heat treated) at a temperature of 1,100° C. or more to 1,400° C. or less for about 1 to 10 hours. The calcining (heat treatment) temperature is preferably 1,100° C. or more to 1,400° C. or less, and more preferably 1,100° C. or more to 1,350° C. or less. Due to the calcining (heat treatment), a dielectric ceramic main component powder can be obtained in which a BaO—TiO$_2$ compound is synthesized. The main component powder obtained by calcining (heat treating) the main component raw material powders includes a BaTi$_4$O$_9$ crystal phase and a Ba$_2$Ti$_9$O$_{20}$ crystal phase.

The main component powder is prepared so that, in X-ray diffraction, the X-ray diffraction peak intensity ratio $I_{29}/I_{14}$ of the maximum diffraction peak intensity ($I_{14}$) of the BaTi$_4$O$_9$ crystal phase to the maximum diffraction peak intensity ($I_{29}$) of the Ba$_2$Ti$_9$O$_{20}$ crystal phase is 1 or more. Further, the X-ray diffraction peak intensity ratio $I_{29}/I_{14}$ is preferably 5 or more, and more preferably 7 or more.

When the X-ray diffraction peak intensity ratio $I_{29}/I_{14}$ is 1 or more, the main component powder includes more of the Ba$_2$Ti$_9$O$_{20}$ crystal phase than the BaTi$_4$O$_9$ crystal phase. Consequently, a dielectric ceramic composition obtained using this main component powder can be co-fired with an Ag-based metal at a temperature low enough that the Ag-based metal does not melt, and also a dielectric ceramic obtained by sintering the dielectric ceramic composition can maintain its dielectric properties, such as relative permittivity ∈r and Qf, and mechanical strength.

During the calcining of the main component raw material powder mixture formed from a raw material powder including barium and a raw material powder including titanium, the heat treatment temperature T1 is set in a temperature range that satisfies the following Inequality (1). Further, when a particle size distribution of the main component raw material powder mixture is measured, if a cumulative 10% particle size is $D_{10}$, a cumulative 50% particle size is $D_{50}$, and a cumulative 90% particle size is $D_{90}$, an index value α of the particle size distribution of the main component raw material powder mixture satisfies the following Equation (2):

$$T1 \geq 1080+42/\alpha \tag{1}$$

$$\alpha=(D_{50}-D_{10})/(D_{90}-D_{10}) \tag{2}$$

The term "cumulative 50% particle size" refers to the particle size at which the cumulative frequency in the particle size distribution of the raw material powder mixture reaches 50%. This is called the "average particle size" of the particle size for all of the particles. The term "cumulative 90% particle size" refers to the particle size at which the cumulative frequency in the particle size distribution of the raw material powder mixture reaches 90%. The term "cumulative 10% particle size" refers to the particle size at which the cumulative frequency in the particle size distribution of the raw material powder mixture reaches 10%.

Using the cumulative 10% particle size $D_{10}$, the cumulative 50% particle size $D_{50}$, and the cumulative 90% particle size $D_{90}$ of the main component raw material powder mixture, and using the above Equation (2), if the particle size distribution of the main component raw material powder mixture is the index value α, when the heat treatment temperature T1 is in a temperature range that satisfies the above Inequality (1), the main component powder includes more of the $Ba_2Ti_9O_{20}$ crystal phase than the $BaTi_4O_9$ crystal phase. Consequently, a dielectric ceramic composition obtained using this main component powder can be co-fired with a Ag-based metal at a temperature low enough that the Ag-based metal does not melt. In addition, a dielectric ceramic obtained by sintering the dielectric ceramic composition can maintain its dielectric properties, such as relative permittivity ∈r and Qf, and mechanical strength.

It is preferred that T1 and α also satisfy the following Inequalities (3) and (4):

$$T1 \geq 1080+62/\alpha \tag{3}$$

$$\alpha \geq 0.350 \tag{4}$$

By setting so that the above Inequalities (3) and (4) are satisfied, the X-ray diffraction peak intensity ratio $I_{25}/I_{14}$ of the maximum diffraction peak intensity ($I_{14}$) of the $BaTi_4O_9$ crystal phase to the maximum diffraction peak intensity ($I_{29}$) of the $Ba_2Ti_9O_{20}$ crystal phase in the main component powder becomes 5 or more, so that the $Ba_2Ti_9O_{20}$ crystal phase can be sufficiently produced.

After the dielectric ceramic main component powder is obtained, the process proceeds to the step of producing the dielectric ceramic composition (Step S12).

Dielectric Ceramic Composition Production Step: Step S12

In the step of producing the dielectric ceramic composition (Step S12), a dielectric ceramic composition formed from the main component and the minor component is obtained by mixing a minor component powder while simultaneously pulverizing the main component powder. By pulverizing the main component powder, a main component powder is obtained which has a desired average particle size. Further, the dielectric ceramic composition can be obtained by mixing the obtained main component powder with a boron oxide and a copper oxide, which are the raw materials of the minor component in the dielectric ceramic composition. The raw materials of the minor component in the dielectric ceramic composition are prepared by weighing predetermined amounts of both the boron oxide and the copper oxide. Examples of the boron oxide include $B_2O_3$. Examples of the copper oxide include CuO. Further, a compound that turns into a boron oxide or a copper oxide when fixed by a heat treatment such as the below-described calcination may also be used as a minor component raw material. As the raw materials of the minor component in the dielectric ceramic composition, in addition to the boron oxide and the copper oxide, a zinc oxide, a lithium oxide, an alkali earth metal oxide, or a compound that turns into these oxides when fired by a heat treatment such as the below-described calcination can be used. Examples of compounds which can turn into these oxides by firing (a heat treatment such as the below-described calcination) include carbonates, nitrates, oxalates, hydroxides, sulfides, and organometallic compounds.

The weighing of each of the minor component raw materials is carried out so that the content of each minor component in the completed dielectric ceramic composition is the above-described desired ratio (parts by mass) with respect to the main component. Specifically, the weighing is carried out so that the boron oxide content is, in terms of $B_2O_3$, 0.5 parts by mass or more to 5.0 parts by mass or less with respect to 100 parts by mass of the main component, and the copper oxide content is, in terms of CuO, 0.1 parts by mass or more to 3.0 parts by mass or less with respect to 100 parts by mass of the main component. Further, optionally, a predetermined amount of zinc oxide (ZnO) is prepared for the minor component. The mixing can be carried out by a mixing method such as dry mixing or wet mixing. For example, the mixing can be carried out using a solvent such as pure water or ethanol with a mixing/dispersion machine, such as a ball mill. The mixing time may be about 4 to 24 hours. The dielectric ceramic composition is dried at preferably 100° C. or more to 200° C. or less, and more preferably 120° C. or more to 140° C. or less, for about 12 to 36 hours.

The pulverizing can be carried out by a pulverizing method such as dry pulverizing or wet pulverizing. For example, the pulverizing can be carried out by wet pulverizing using a solvent such as pure water or ethanol with a ball mill. The pulverizing time is not especially limited, and may be set so that a main component powder having the desired average particle size is obtained. For example, the pulverizing time may be about 16 to 100 hours. The drying of the powder is preferably carried out at a drying temperature of 100° C. or more to 200° C. or less, and more preferably 120° C. or more to 140° C. or less, for about 12 to 36 hours.

The dielectric ceramic composition formed from the main component and the minor component may be calcined at a temperature lower than the below-described firing temperature (860° C. or more to 1,000° C. or less), for example, at 600° C. or more to 800° C. or less, for about 1 to 10 hours.

If this calcining is performed, the calcined powder is pulverized and dried to obtain the dielectric ceramic composition. The pulverizing can be carried out by a pulverizing method such as dry pulverizing or wet pulverizing. For example, the pulverizing can be carried out with a ball mill using a solvent such as pure water or ethanol. The pulverizing time is set to about 4 to 24 hours. The drying of the pulverized dielectric ceramic composition is preferably carried out at a treatment temperature of 100° C. or more to 200° C. or less, and more preferably 120° C. or more to 140° C. or less, for about 12 to 36 hours.

After the dielectric ceramic composition is obtained, the process proceeds to the step of producing a molded body (Step S13).

Molding Production Step: Step S13

In the step of producing a molded body (Step S13), a paste including a powder of the dielectric ceramic composition is coated on the substrate to produce the molded body. The obtained dielectric ceramic composition powder is added to an organic binder, such as a polyvinyl alcohol binder, an acrylic binder, or an ethyl cellulose binder. Then, the resultant mixture is formed into a sheet shape, to obtain a green sheet. Examples of the method for forming the green sheet include wet molding, such as a sheet method and a printing method, and dry molded body, such as press molding. After the molded body is produced, the process proceeds to the step of producing a laminated body (Step S14).

Laminated Body Production Step: Step S14

In the step of producing a laminated body (step S14), a conductive paste containing Ag is coated onto the formed green sheet so as to form an internal electrode having a desired shape. A plurality of the green sheets on which the conductive paste was coated are produced as necessary. These green sheets are laminated and pressed to obtain a laminated body. Further, optionally, a conductive paste is coated on this laminated body so as to form a terminal having a predetermined shape. Subsequently, the laminated body is subjected to solvent removal treatment, and the organic solvent is removed from the conductive paste by drying. After the laminated body is produced, the process proceeds to the step of firing the laminated body (Step S15), Firing Step: Step S15

In the firing step (Step S15), the binder is removed from the obtained laminated body, which is then fired to obtain a sintered body. Consequently, the dielectric ceramic according to the present embodiment is obtained. The firing is preferably carried out, for example, in an oxygen atmosphere, such as air. The firing temperature is preferably equal to or less than the melting point of the Ag-based metal used as a conductor material. Specifically, the firing temperature is preferably 860° C. or more to 1,000° C. or less, and more preferably 880° C. or more to 940° C. or less.

The sintered body is cooled, and then an external electrode and the like are optionally formed on the obtained dielectric ceramic. The dielectric ceramic is cut to a desired dimension, whereby an electronic part having an external electrode and the like formed on the dielectric ceramic is completed.

If the method for producing the dielectric ceramic according to the present embodiment is used as described above, since the obtained electronic part includes the dielectric ceramic according to the present embodiment, not only can the dielectric ceramic composition be co-fired with a low-melting-point conductor material, such as an Ag-based metal, at a temperature low enough that the Ag-based metal does not melt, but also an electronic part having excellent dielectric properties and mechanical strength can be provided.

Electronic Part

Figure 2:
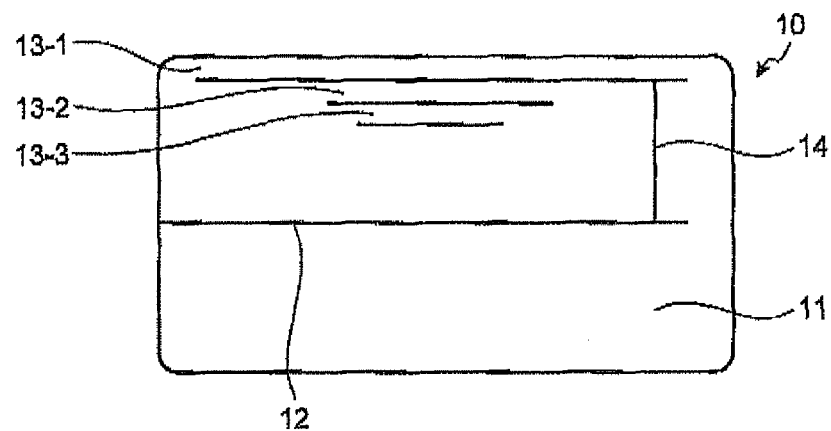
FIG. 2 is a schematic cross-sectional view illustrating the configuration of a band-pass filter obtained using the dielectric ceramic according to the present embodiment.

Examples of applications for the electronic part obtained using the dielectric ceramic according to the present embodiment include a band-pass filter for high-frequency communication performed in a mobile phone, for example. FIG. 2 is a schematic cross-sectional view illustrating the configuration of a band-pass filter obtained using the dielectric ceramic according to the present embodiment. As illustrated in FIG. 2, a band-pass filter 10 includes a plurality of dielectric layers 11, a coil 12, capacitor pattern portions 13-1 to 13-3, and a via (via conductor) 14. The dielectric layers 11 are formed from the dielectric ceramic composition used to form the dielectric ceramic according to the present embodiment. The coil 12 and the capacitor pattern portions 13-1 to 13-3 are formed from an Ag conductor. The via 14 is a via hole portion filled with an Ag conductor which allows conductance between the coil 12 and the capacitor pattern portions 13-1 to 13-3. The via 14 is formed with an LC resonance circuit. The capacitor pattern portion 13-1 is connected with the coil 12 by the via (via conductor) 14. Although the capacitor portion in the band-pass filter 10 is a three-layer structure, the band-pass filter 10 is not limited to a three-layer structure, and may be formed as an arbitrary multilayer structure. As described above, in the production of the dielectric layers 11, a dielectric ceramic composition is used that includes for the main component a BaO—$TiO_2$ compound in which the ratio of the $Ba_2Ti_9O_{20}$ crystal phase is larger than that of the $BaTi_4O_9$ crystal phase. Consequently, the band-pass filter 10 can be obtained by co-firing the above-described dielectric ceramic composition with the coil 12, the capacitor pattern portions 13-1 to 13-3, and the via 14, so that the dielectric properties and strength of the dielectric layers 11 can be maintained.

The plurality of dielectric layers 11 are produced using a dielectric ceramic composition in which, when the BaO—$TiO_2$ compound included in the main component is represented by the composition formula (BaO.xTiO), a molar ratio x of $TiO_2$ with respect to BaO is 4.6 or more to 8.0 or less, a boron oxide content is, in terms of $B_2O_3$, 0.5 parts by mass or more to 5.0 parts by mass or less with respect to 100 parts by mass of the main component, and a copper oxide content is, in terms of CuO, 0.1 parts by mass or more to 3.0 parts by mass or less with respect to 100 parts by mass of the main component. If, for example, an FR-4 grade resin substrate formed from a material having a coefficient of linear expansion of 13 ppm/° C. and a resin substrate formed from a material having a coefficient of linear expansion, of 10 ppm/° C. are used as the resin substrate on which the band-pass filter 10 is mounted, when soldering the band-pass filter 10 onto the resin substrate the coefficient of linear expansion of the produced band-pass filter 10 is about 10 ppm/° C., so that the difference with the resin substrate oars be reduced. Consequently, even when a thermal shock test is carried out under temperature conditions of −55° C. or more to 125° C. or less and 1,000 test cycles, the occurrence of cracks in the dielectric layers 11 can be suppressed, and the soldering section between the band-pass filter 10 and the resin substrate can be prevented from breaking.

The dielectric ceramic according to the present embodiment is not limited to the electronic part illustrated in FIG. 2, in which the dielectric layer 11 and the internal electrode are alternately laminated. The dielectric ceramic according to the present embodiment can be preferably used in other electronic parts, as long as such electronic part includes a dielectric layer 11. Further, the dielectric ceramic according to the present embodiment can be preferably used even in an electronic part in which extra elements are externally mounted separately.

EXAMPLE

The present invention will now be described in more detail with reference to the following examples and comparative example. However, the present invention is not limited to the following examples.

Examples 1-1 to 1-6

Index Value α of Main Component Raw Material Powder Mixture and Evaluation of Mixing and Dispersion Properties A 99.2% pure $BaCO_3$ powder and a 99.8% pure $TiO_2$ powder were weighed as the main component raw material powders so that the composition formula was $BaO.xTiO_2$. Main component raw material powder mixtures (A to F) were then produced by varying the mixing and dispersion conditions of a mixing/dispersion machine that used $ZrO_2$ beads. The treatment conditions of the mixing/dispersion machine were set so that the mixing and dispersion properties increased in order from treatment conditions a to f.
Particle Size Distribution The particle size distributions of the main component raw material powder mixtures (A to F) were measured using a laser diffraction particle size distribution analyzer (trade name: Microtrac X100, manufactured by Nikkiso Co., Ltd.). The particle size distribution index value α was calculated from the measurement results of the main component raw material powder mixtures (A to F). The calculated results are shown in Table 1.

TABLE 1

|  |  |  | Example 1-1 | Example 1-2 | Example 1-3 | Example 1-4 | Example 1-5 | Example 1-6 |
|---|---|---|---|---|---|---|---|---|
| Main component raw material powder mixture | | | A | B | C | D | E | F |
| Mixing/dispersion machine treatment conditions | | | a | b | c | d | e | f |
| Particle size distribution measurement results | Particle size [μm] | $D_{10}$ | 0.381 | 0.377 | 0.371 | 0.361 | 0.359 | 0.365 |
| | | $D_{50}$ | 0.503 | 0.492 | 0.484 | 0.466 | 0.462 | 0.467 |
| | | $D_{90}$ | 0.739 | 0.706 | 0.680 | 0.636 | 0.625 | 0.626 |
| | Index value α | | 0.341 | 0.350 | 0.366 | 0.382 | 0.387 | 0.391 |
| Variation coefficient [σ/mean] | | Ba | 0.532 | 0.402 | 0.372 | 0.357 | 0.353 | 0.333 |
| | | Ti | 0.191 | 0.142 | 0.142 | 0.120 | 0.119 | 0.112 |
| Specific surface area [m²/g] | | | 6.52 | 6.79 | 7.07 | 7.25 | 7.63 | 7.91 |

From Table 1, it can be seen that the index value α increased in order from treatment conditions a to f of the mixing/dispersion machine. Therefore, it was confirmed that the index value α increases as the mixing and dispersion properties of the main component raw material powder mixtures (A to F) increase.

The dispersion properties of the main component raw material powder mixtures (A to F) were measured using an X-ray microanalyzer (SPMA: Electron Probe Micro-Analysis), Based on EPMA, the elemental distribution state of Ba and Ti in the main component raw material powder mixtures (A to F) was confirmed for a 200 μm-square (200 μm×200 μm) range of the main component raw material powder mixtures (A to F) to calculate a variation coefficient (standard deviation σ/mean) obtained by dividing the standard deviation σ of the X-ray intensity for each element by the X-ray intensity mean for each element. The variation coefficient measurement results are shown in Table 1. The smaller the value of the variation coefficient, which represents relative dispersion, the less the amount of elemental segregation. As shown in Table 1, the dispersion properties of Ba and Ti increased in order of the treatment conditions a to if of the mixing/dispersion machine.

Therefore, it is confirmed that there is a relationship between the index value α determined from the measurement results of the particle size distribution of the main component raw material powder mixtures (A to F) and the mixed dispersion state of the elements in the main component raw material powder mixtures, in which the mixed dispersion state of Ba and Ti improves as the index value a determined from the measurement results of the particle size distribution of the main component raw material powder mixtures (A to F) increases.

Further, it was confirmed by measuring the specific surface area of the main component raw material powder mixtures (A to F) by a BET method that the main component raw material powder mixtures (A to F) were fine powder with a good mixed dispersion state.

Examples 2-1 to 2-6

Evaluation of X-Ray Diffraction Peak Intensity Ratio of Heat Treated Main Component Powder The main component raw material powder mixtures (A to F) were calcined (heat treated) in a temperature range of 1,170° C. to 1,250° C. The diffraction peak intensities of the $BaTi_4O_9$ crystal phase and the $Ba_2Ti_9O_{20}$ crystal phase formed in the heat treated main component powder (A to F) were compared using an X-ray diffraction apparatus that used a Cu tube. During the comparison, the respective maximum diffraction peaks of the crystal phases were employed. Concerning the $BaTi_4O_9$ crystal phase, based on the maximum diffraction peak data listed in reference code 01-077-1565 of an ICOD (International Center for Diffraction Data) card, the intensity ($I_{14}$) in the vicinity of 2θ=30.106 (deg) was used. Concerning the $Ba_2Ti_9O_{20}$ crystal phase, based on the maximum diffraction peak data listed in reference code 01-076-1424 of an TCDD card, the intensity ($I_{29}$) in the vicinity of 2θ=28.583 (deg) was used. Using these values, the X-ray diffraction peak intensity ratio $I_{29}/I_{14}$ was calculated. The X-ray diffraction peak intensity ratio $I_{29}/I_{14}$ calculation results are shown in Table 2. In Table 2, a mark SS represents an X-ray diffraction peak intensity ratio $I_{29}/I_{14}$ of 5 or more, a mark AA represents an X-ray diffraction peak intensity ratio $I_{29}/I_{14}$ of 1 or more to less than 5, and a mark BB represents an X-ray diffraction peak intensity ratio $I_{29}/I_{14}$ of less than 1.

TABLE 2

| | | | Example 2-1 | | Example 2-2 | | Example 2-3 | | Example 2-4 | | Example 2-5 | | Example 2-6 | |
|---|---|---|---|---|---|---|---|---|---|---|---|---|---|---|
| Main component raw material powder mixture | | | A | | B | | C | | D | | E | | F | |
| Particle size distribution measurement results | Index value α | | 0.341 | | 0.350 | | 0.366 | | 0.382 | | 0.387 | | 0.391 | |
| Heat treatment temperature T1 | $1040 + 62/\alpha$ | | — | | 1217 | | 1209 | | 1202 | | 1200 | | 1199 | |
| | $1080 + 42/\alpha$ | | 1203 | | 1200 | | 1195 | | 1190 | | 1189 | | 1187 | |
| X-ray diffraction peak intensity ratio $I_{29}/I_{14}$ | Heat treatment temperature T1 | 1250° C. | 1.28 | AA | 7.69 | SS | 7.69 | SS | 7.69 | SS | 7.14 | SS | 7.16 | SS |
| | | 1240° C. | 1.32 | AA | 7.14 | SS | 7.24 | SS | 6.67 | SS | 6.25 | SS | 7.14 | SS |
| | | 1230° C. | 1.15 | AA | 6.17 | SS | 7.14 | SS | 5.56 | SS | 5.88 | SS | 6.25 | SS |
| | | 1220° C. | 1.10 | AA | 5.00 | SS | 6.63 | SS | 5.26 | SS | 5.64 | SS | 5.93 | SS |
| | | 1210° C. | 1.08 | AA | 4.17 | AA | 5.56 | SS | 5.00 | SS | 5.28 | SS | 5.56 | SS |
| | | 1200° C. | 0.42 | BB | 1.41 | AA | 3.57 | AA | 3.84 | AA | 5.02 | SS | 5.26 | SS |
| | | 1190° C. | 0.20 | BB | 0.50 | BB | 0.91 | BB | 1.67 | AA | 1.85 | AA | 2.86 | AA |
| | | 1170° C. | 0.07 | BB | 0.08 | BB | 0.08 | BB | 0.10 | BB | 0.11 | BB | 0.13 | BB |

As shown in Table 2, it was revealed that the higher the temperature that calcination (heat treatment) was carried out at, the higher the diffraction peak of the $Ba_2Ti_9O_{20}$ crystal phase was with respect to the diffraction peak of the $BaTi_4O_9$ crystal phase. However, it was also revealed that the greater the used amount of a main component raw material powder mixture having a large index value α, the more $Ba_2Ti_9O_{20}$ crystal phase that was produced at a lower temperature. Further, in Example 2-1, it was impossible to obtain an X-ray diffraction peak intensity ratio $I_{29}/I_{14}$ of 5 or more even by increasing the temperature to 1,250° C. It was thus revealed that to obtain an X-ray diffraction peak intensity ratio $I_{29}/I_{14}$ of 5 or more, it is necessary to have an index value α of 0.350 or more FIG. 3 illustrates the relationship between the index value α and the heat treatment temperature T1. In FIG. 3, the solid line represents the equation $T1=1080+42/\alpha$, and the dashed line represents the equation $T1=1040+62/\alpha$. As illustrated in FIG. 3, it was revealed that if the heat treatment temperature was greater than the equation $1080+4+42/\alpha$ (solid line in FIG. 3), the X-ray diffraction peak intensity ratio $I_{29}/I_{14}$ could be set to 1 or more, so that the maximum diffraction peak of the $Ba_2Ti_9O_{20}$ crystal phase could be set to be equal to or more than the maximum diffraction peak of the $BaTi_4O_9$ crystal phase. In addition, it was revealed that if the index value α was 0.350 or more, and T1 was in a temperature range equal to or more than the equation $1040+62/\alpha$ (dashed line in FIG. 3), the X-ray diffraction peak intensity ratio $I_{29}/I_{14}$ could be set to 5 or more.

Examples 3-1 to 3-4 and Comparative Example 3-1

Density and Strength of Dielectric Ceramic and Evaluation of Dielectric Properties Samples (refer to Examples 3-1 to 3-4 and Comparative Example 3-1) whose crystal phase states were confirmed to be different were prepared by performing X-ray diffraction on main component powders that had been calcined (heat treated). $B_2O_3$ and CuO were wet-mixed as the minor component while simultaneously pulverizing the main component powders. The dielectric ceramic composition of this main component and minor component were again calcined, and then again pulverized. An organic binder was added to the obtained powders to produce a dry molded body. Further, a separate organic binder was added, and sheet molded bodies were produced on a polyethylene terephthalate (PET) substrate. On some of these sheet molded bodies, a conductive paste having Ag as a main component was coated as a conductor material. A suitable number of sheets were then laminated and pressed to produce a sheet laminated molded body including a conductive paste. For the remaining sheet molded bodies, without coating a conductive paste having Ag as a main component, a suitable number of these sheets were laminated and pressed to produce a sheet laminated molded body that did not include a conductive paste. The dry molded body, the sheet laminated molded body including a conductive paste, and the sheet laminated molded body that did not include a conductive paste were fired at a reference temperature (A)° C. (930° C.) at which Ag does not melt. For a sample (dielectric ceramic) obtained by firing the sheet laminated molded body that did not include a conductive paste, the density and the three-point bending strength of the dielectric ceramic were measured. Further, using a sample (dielectric ceramic) obtained by firing the dry molded body, the dielectric properties (relative permittivity εr and quality factor Qf) were measured based on a resonator method. In addition, for a sample (dielectric ceramic) obtained by firing the sheet laminated molded body including a conductive paste, it was confirmed whether the Ag included in the conductive paste had melted or not. Table 3 shows the measurement results for the X-ray diffraction peak intensity ratio $I_{29}/I_{14}$ of the main component powders used for Examples 3-1 to 3-4 and Comparative Example 3-1, the X-ray diffraction peak intensity ratio $I_{29}/I_{14}$ of the dielectric ceramics, the density thereof, the three-point bending strength thereof, the dielectric properties (relative permittivity εr and quality factor Qf) thereof, and the Ag melt state

TABLE 3

| | Main component powder | | Dielectric ceramic [main component powder $(BaO \cdot xTiO_2)$ + minor component $(B_2O_3, CuO)$] | | | | | Co-firing with conductor |
|---|---|---|---|---|---|---|---|---|
| | X-ray diffraction peak intensity ratio $I_{29}/I_{14}$ | Firing temperature | X-ray diffraction peak intensity ratio $I_{29}/I_{14}$ | Density [g/cm³] | Three-point bending strength [MPa] | Dielectric properties εr [—] | Qf [GHZ] | material Ag Melt state of conductor material Ag |
| Example 3-1 | 4.02 | Reference temperature | 5.87 | 4.40 | 246 | 42.9 | 13,786 | No Problems |

TABLE 3-continued

| | Main component powder | Dielectric ceramic [main component powder (BaO · xTiO$_2$) + minor component (B$_2$O$_3$, CuO)] | | | | | | Co-firing with conductor |
|---|---|---|---|---|---|---|---|---|
| | X-ray diffraction | | X-ray diffraction | | Three-point bending | Dielectric properties | | material Ag Melt state of |
| | peak intensity ratio I$_{29}$/I$_{14}$ | Firing temperature | peak intensity ratio I$_{29}$/I$_{14}$ | Density [g/cm$^3$] | strength [MPa] | εr [—] | Qf [GHZ] | conductor material Ag |
| Example 3-2 | 3.70 | A(° C.) [930° C.] | 4.19 | 4.43 | 240 | 43.7 | 13,151 | No Problems |
| Example 3-3 | 2.22 | | 3.49 | 4.39 | 236 | 43.3 | 13,137 | No Problems |
| Example 3-4 | 1.30 | | 1.89 | 4.37 | 227 | 43.4 | 11,458 | No Problems |
| | | | 0.42 | 4.11 | 187 | 38.7 | 8,349 | No Problems |
| Comparative example 3-1 | 0.11 | Reference temperature A(° C.) + 40° C. [970° C.] | — | 4.36 | | | | Melting (spheroidizing) |

As shown in Table 3, it was confirmed that if the X-ray diffraction peak intensity ratio I$_{29}$/I$_{14}$ of a dielectric ceramic was less than 1, the density, strength, and dielectric properties (relative permittivity εr and quality factor Qf) of the dielectric ceramic deteriorated (refer to Comparative Example 3-1). Further, when the X-ray diffraction peak intensity ratio I$_{29}$/I$_{14}$ of the main component powder of the dielectric ceramic composition is less than 1, the powder was not sufficiently sintered at the reference temperature A (930° C.). In addition, since the powder of the dielectric ceramic composition was not sufficiently sintered, when sintered at a temperature (970° C.) 40° C. higher than the reference temperature A, the Ag conductor material melted (refer to Comparative Example 3-1). In contrast, when a powder having a high X-ray diffraction peak intensity ratio I$_{29}$/I$_{14}$ was used as the main component powder of the dielectric ceramic, the X-ray diffraction peak intensity ratio I$_{29}$/I$_{14}$ of the dielectric ceramic also increased (refer to Examples 3-1 to 3-4). Therefore, it was shown that by using a powder having a high X-ray diffraction peak intensity ratio I$_{29}$/I$_{14}$ for the main component powder of a powder of the dielectric ceramic, the X-ray diffraction peak intensity ratio I$_{12}$/I$_{14}$ of the dielectric ceramic also increased, and the density, strength, and dielectric properties (relative permittivity εr and quality factor Qf) of the dielectric ceramic could be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A dielectric ceramic comprising:
   a main component that contains a BaTi$_4$O$_9$ crystal phase and a Ba$_2$Ti$_9$O$_{20}$ crystal phase and is represented by a composition formula (BaO.xTiO$_2$), the main component having a molar ratio x of TiO$_2$ with respect to BaO, the molar ratio x being in the range of 4.6 to 8.0, and in X-ray diffraction, the main component having an X-ray diffraction peak intensity ratio I$_{29}$I$_{14}$ of a maximum diffraction peak intensity (I$_{14}$) of the BaTi$_4$O crystal phase to a maximum diffraction peak intensity (I$_{29}$) of the Ba$_2$Ti$_9$O$_{20}$ crystal phase, the X-ray diffraction peak intensity ratio I$_{29}$/I$_{14}$ being 1 or more; and
   a minor component that contains a boron oxide and a copper oxide, in which a content of the boron oxide in terms of B$_2$O$_3$ is in the range of 0.5 to 5.0 parts by mass with respect to 100 parts by mass of the main component, and a content of the copper oxide in terms of CuO is in the range of 0.1 to 3.0 parts by mass based on 100 parts by mass of the main component.

* * * * *